US006553566B1

(12) United States Patent
Grant et al.

(10) Patent No.: US 6,553,566 B1
(45) Date of Patent: Apr. 22, 2003

(54) VIEWER CONTROLLED MULTI-FUNCTION SYSTEM FOR PROCESSING TELEVISION SIGNALS

(75) Inventors: Robert G. Grant, St. Leonard, MD (US); Judy J. Grant, St. Leonard, MD (US); David G. Yurth, Salt Lake City, UT (US); Jack D. Robinson, San Francisco, CA (US)

(73) Assignee: X Out Corporation, Palm Coast, FL (US)

( * ) Notice: Subject to any disclaimer, the term of this patent is extended or adjusted under 35 U.S.C. 154(b) by 0 days.

(21) Appl. No.: 09/384,606

(22) Filed: Aug. 27, 1999

Related U.S. Application Data

(60) Provisional application No. 60/098,037, filed on Aug. 27, 1998.

(51) Int. Cl.[7] ............................ H04N 7/16; H04N 7/087; H04N 5/45
(52) U.S. Cl. ........................ 725/28; 348/465; 348/565; 725/25; 725/136
(58) Field of Search .............................. 725/25, 27, 28, 725/31, 136, 137; 348/465, 468, 565

(56) References Cited

U.S. PATENT DOCUMENTS

| | | | | |
|---|---|---|---|---|
| 5,485,518 A | * | 1/1996 | Hunter et al. ............... 380/241 |
| 5,828,402 A | * | 10/1998 | Collings ...................... 348/460 |
| 6,020,882 A | * | 2/2000 | Kinghorn et al. ........... 345/716 |
| 6,075,550 A | * | 6/2000 | Lapierre ...................... 348/465 |
| 6,104,423 A | * | 8/2000 | Elam ............................. 725/28 |
| 6,115,057 A | * | 9/2000 | Kwoh et al. ................ 348/460 |
| 6,137,486 A | * | 10/2000 | Yoshida et al. ............. 345/719 |
| 6,166,780 A | * | 12/2000 | Bray ........................... 348/468 |
| 6,175,718 B1 | * | 1/2001 | Kim et al. ..................... 725/25 |
| 6,216,263 B1 | * | 4/2001 | Elam .......................... 725/151 |

\* cited by examiner

Primary Examiner—John Miller
Assistant Examiner—Michael M. Hoye
(74) Attorney, Agent, or Firm—Donald R. Fraser

(57) ABSTRACT

An apparatus and a method for manipulating video, audio, closed-captioned and compressed video packet data embedded in video programming signals includes a video signal processor for embedding data into a broadcast video signal prior to broadcast, the video signal containing at least one of video information, audio information, closed-captioned information and video packet data information. The embedded data is embedded in at least one predetermined line of at least one predetermined frame of the video program signal. An instruction defining a predetermined screening format for at least one of the video information, the audio information, the closed-captioned information and the video packet data information is stored and a circuit is responsive to the embedded data and the stored instruction for reproducing the information in the video signal in a predetermined screening format.

15 Claims, 3 Drawing Sheets

VIEWER CONTROLLED MULTI-FUNCTION SYSTEM FOR PROCESSING TELEVISION SIGNALS

CROSS-REFERENCE TO RELATED APPLICATION

This application is a continuation of U.S. Provisional Application Serial No. 60/098,037, filed Aug. 27, 1998.

BACKGROUND OF THE INVENTION

The present invention relates generally to an apparatus for processing a video signal and, in particular, to a viewer controlled apparatus for video frame scrambling, automatic speech recognition, selective word muting, selective closed-captioned text deletion and compressed video packet storage and display.

Indiscriminate television programming has become increasingly more offensive particularly to the ears, eyes, and minds of youth. The listening and viewing public have no effective means to effectively monitor television programming.

The introduction of the V chip by Presidential Executive Order constitutes a measure of control. However, the utilization of the V chip effectively places entire segments of the broadcast programming under the control of a small segment of people who presumably properly represent the interests of the vast majority of the population. There is no practical procedure for the majority to participate in the television broadcast ratings process. Consequently, the television viewing audience is left with the choice of either selecting or rejecting an entire programming segment based upon the electronic filtering process embedded in the V chip technology.

SUMMARY OF THE INVENTION

The present invention performs the following functions: a. scrambles selected frames of video content prior to display on the screen of a target device (i.e., television, monitor, etc.) which are deemed to contain objectionable material (frontal nudity, explicit depictions of sex acts, extreme violence and drug use); b. converts speech to text and mutes words, word combinations and phrases which are deemed to be objectionable; c. deletes words, word combinations and phrases contained in the closed-captioned text strip which accompanies most video programming; and d. stores compressed video packets for display in "picture-in-picture" windows on the screen of a target device. The invention performs these functions as instructed by each individual viewer via a hand held infra-red remote control unit.

The present invention enables the viewer of television programming, obtained from any source, to exercise individual control over those portions of the broadcast content which are deemed to be objectionable, in the privacy of the viewer's own home or place of business. This integration replaces the V Chip by placing control over the display of content in the hands of the viewer rather than in the hands of an anonymous standards committee.

It is an object of the present invention to produce a method and apparatus under the control of television viewers to enable the selective excise of offensive oral content from a stream of language as it is received by a television receiver. Another object of the invention is to produce a method and apparatus for screening the audio content of a received television signal to protect the rights of freedom of expression and privacy by making possible for the television viewer to proactively select and reject what is received on a real time basis regardless of the programming choices selected by the producer or broadcaster.

It is another object of the invention to produce a method and apparatus under the control of the television viewing audience for removing or deleting a word or phrase from the audio portion of the broadcast signal.

Still another object of the invention is to produce a method and apparatus for removing or deleting selected portions of the audio content by employing a speech recognition program which effectively compares the received audio signal with a library of stored objectionable speech and excises that portion of the received signal which matches the stored objectionable stored speech.

The above as well as other objects and advantages of the invention may be readily achieved by a method and apparatus for removing a portion of a received television broadcast signal, wherein the method includes the steps of recognizing the components of human speech in a highly accurate digital format; discriminating words, phrases, and sound audio signals received by a television receiver; dissecting waveform equivalents of speech and strings of text into discrete components; matching the discrete components of the received television broadcast signal with the components of previously recognized human speech; deleting portions of the received television broadcast signal corresponding to the previously selected and/or recognized human speech and/or text components; and permitting the balance of the sound signals received by the television receiver to be broadcast as originally produced and transmitted.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
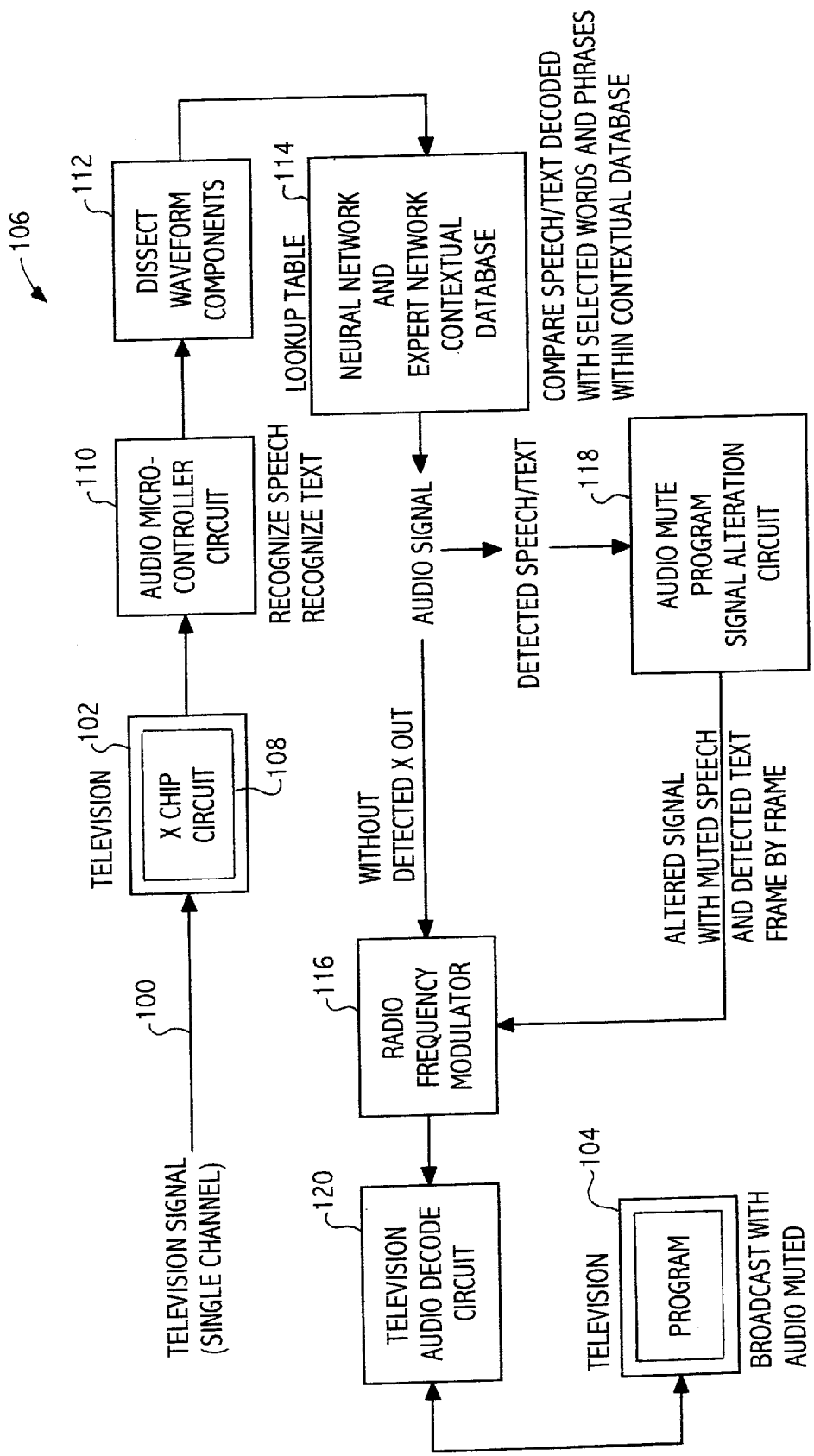
FIG. 1 is a schematic block diagram of a typical television receiver system incorporating a signal processing system in accordance with a first embodiment of the present invention.

Referring to FIG. 1, there is shown a schematic block diagram of a signal processing system in accordance with a first embodiment of the present invention for removing a portion of a received video signal. A typical video program signal is received from a source (not shown) on an input line 100 that is connected to an input of a standard television tuner circuit 102 for display on a television monitor. For example, the signal on the line 100 can be one of a plurality of television channels received by an antenna, cable or satellite dish, or can be generated by a VCR, DVD or other player of prerecorded video programs. The video signal on the line 100 has both a video content portion and an audio content portion. Unless modified, the audio content portion of the video signal will be reproduced for human hearing by a speaker in a display device 104 associated with the television tuner 102. However, the signal processing system according to the present invention selectively modifies the audio content portion prior to reproduction as explained below.

This signal processing system 106, identified as an X-Out Chip (hereinafter X Chip), has an input circuit 108 connected to the tuner 102 and includes an audio microcontroller circuit 110 capable of recognizing speech and/or text in the received video signal. An output of the audio microcontroller circuit 110 is connected to an input of a dissection circuit 112 capable of dissecting waveform components. The circuit 112 has an output connected to an input of a look-up table circuit 114 provided to receive the waveform components and to compare speech and/or text decoded in selected words and phrases with information stored in a contextual database.

The circuit 114 has an output connected to an input of a radio frequency (RF) modulator 116 and to an input of an audio mute program signal alteration circuit 118. The circuit 114 generates an audio signal that is altered by the signal alteration circuit 118 to effectively delete objectionable words or text on a video frame-by-frame basis. The altered signal is fed from an output of the circuit 118 to another input of the RF modulator 116 and mixed with the input signal from the circuit 114. The mixed signal is fed from an output of the modulator 116 connected to an input of a television audio decode circuit 120. The circuit 120 is a part of the television circuitry and has an output connected to an input of the television speaker (not shown) in the typical television display device 104. The mixed signal from the RF modulator 116 is audibly reproduced with the undesirable audio portion muted.

It will be appreciated that the above-described system 106 will incorporate a series of integrated circuit chips. The chip set may utilize up to twenty-five (25) character strings of six (6) characters. Another system would contain contextual software up to two hundred fifty (250) words/word phrases of up to ten (10) characters each, a programmable library permitting the user to program an individual library or lexicon of words and phrases and the ability to operate up to three (3) distinct levels of filtering severity. This system will enable the user to replace the muted words and/or phrases with suitable substitutes.

Figure 2:
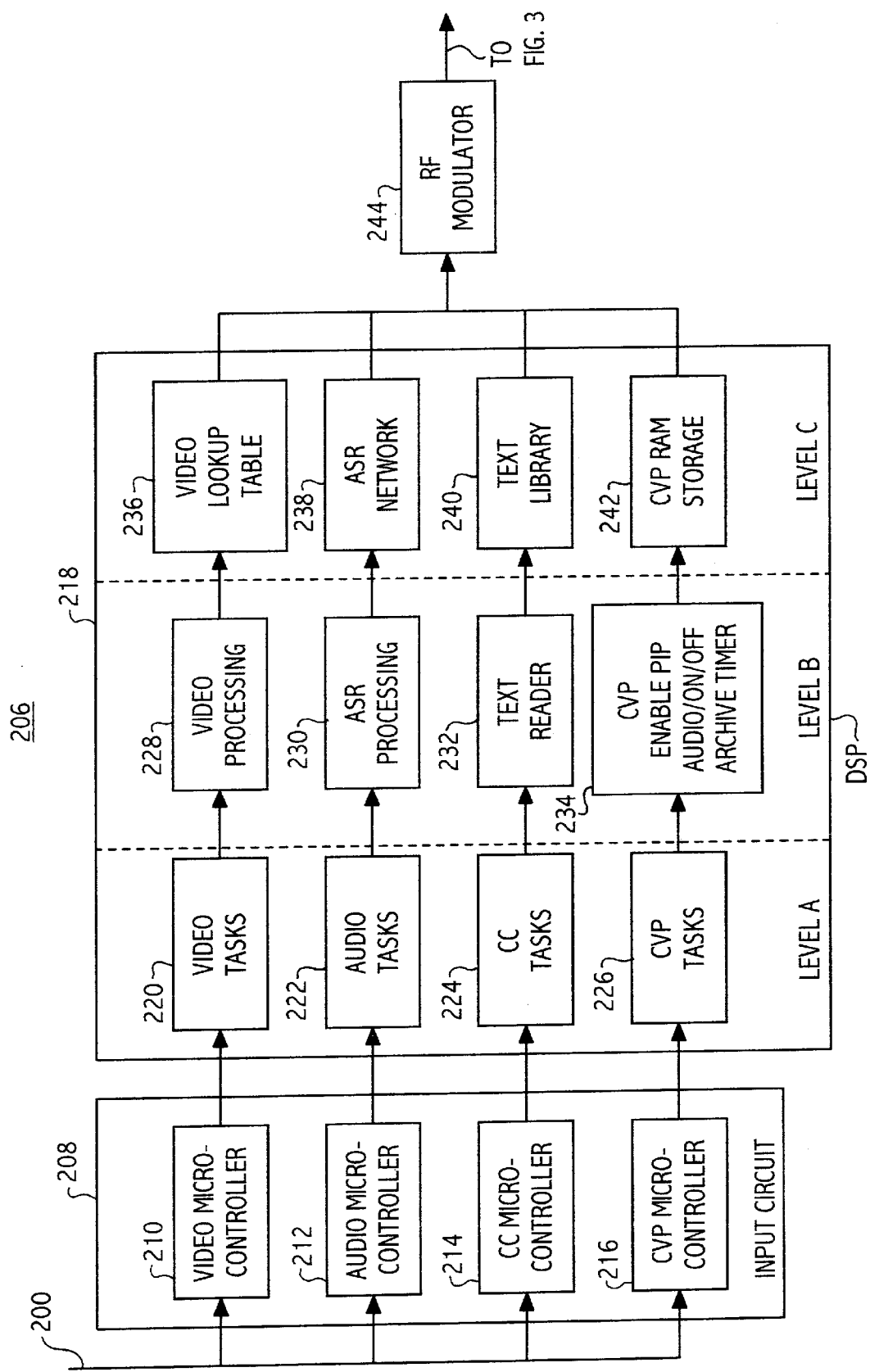
FIGS. 2 and 3 are a schematic block diagrams of a typical video display device incorporating a signal processing system in accordance with a second embodiment of the present invention.
Figure 3:
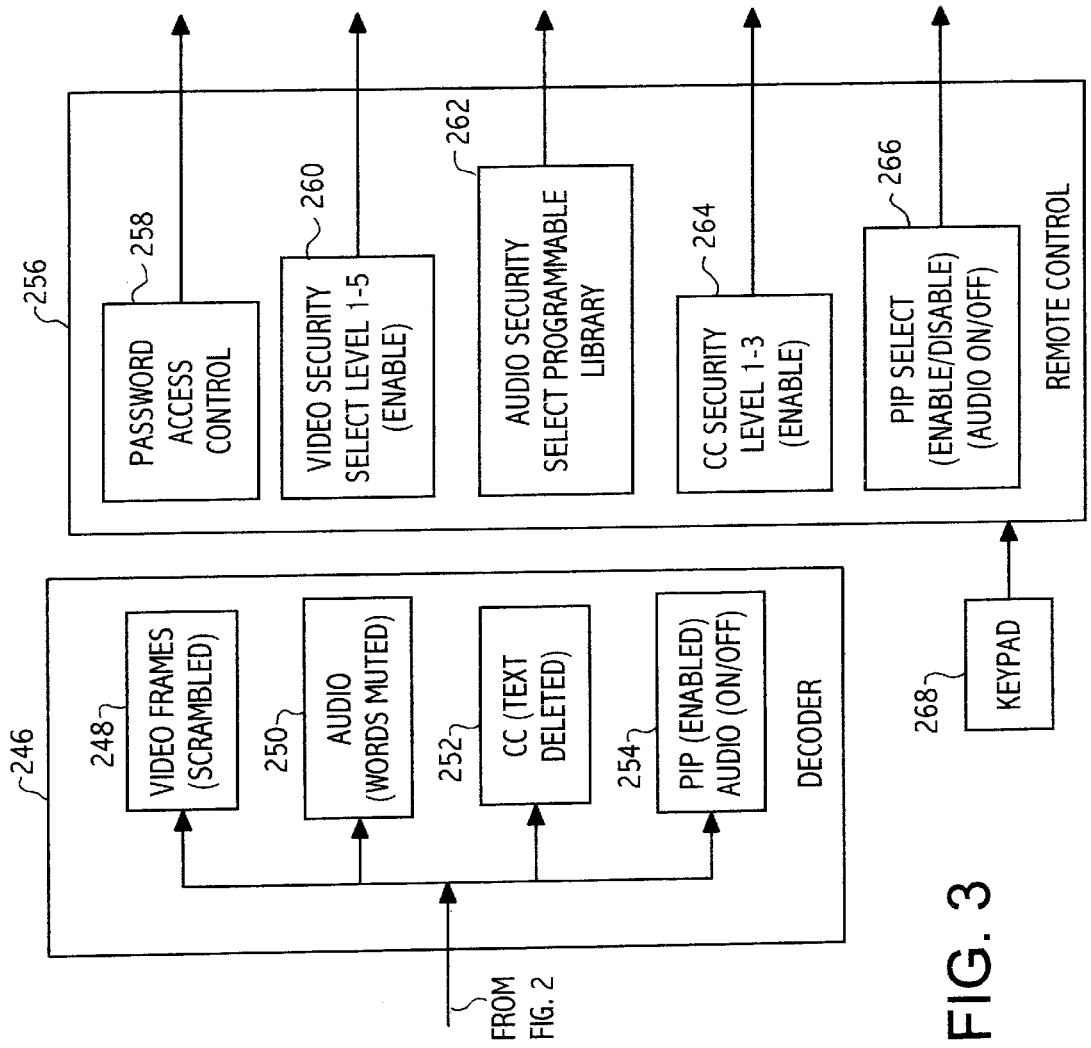

A second embodiment of the present invention is shown in the FIGS. 2 and 3 as a multi-function signal processing system 206. Referring to FIG. 2, a video program signal is received from a source (not shown) on an input line 200 that is connected to the input of the system 206. As explained below, this signal can be a standard video program signal as described above or a specially encoded video program signal. In either case, the video signal has both a video content portion and an audio content portion. Unless modified, the video and audio content portions of the video program signal will be reproduced for human viewing and hearing by a television display device. However, the signal processing system 206 according to the present invention selectively modifies the video signal prior to reproduction as explained below.

The signal processing system 206, identified as an X-Out Chip (X Chip), includes an input circuit 208 connected to the tuner 102 and incorporates the audio signal portion processing functions described above. A detailed-description of the system follows based upon the processing of a video program signal to be displayed by a television display device.

System Description

The X Chip multi-function system 206 consists of an electronic sub-assembly designed to manipulate the video, audio, closed-captioned and compressed video packet (CVP) data embedded in video programming signals intended to be displayed on a television screen. The device incorporates standard input headgear originating at a television channel selector device, VCR, DVD player or other compatible video signal source. This assumes that the X Chip system 206 will accommodate input signals from any compatible device such as a VCR, DVD player or optical disk reader. The device contains a variety of electronic components, including a series of microcontroller IC chipsets, a proprietary digital signal processor (DSP), various proprietary software programs and data processing routines, a radio frequency (RF) modulator and various switches, LED display components and a power supply.

Functions

The broadcast and production standard which governs the format of video signal information defines individual frames which each contain video, audio and related analog or digital waveform components. The video component of each video frame occupies approximately 90% of the bandwidth. In this application, each frame of video which is fed into the X Chip system 206 will have been encoded with an embedded data packet at the point of production or broadcast, which packet identifies those frames which contain depictions of five levels of potentially objectionable content: (1) frontal nudity, (2) gratuitous sex, (3) extreme violence, (4) drug use and (5) other.

The X Chip system 206 is equipped with an automatic speech recognition (ASR) program which enables the digital signal processor (DSP) to convert the information contained on the audio portion of the video signal into a continuous text stream. Line Twenty (20) of the television signal contains CC information; CC being the universally recognized symbol denoting the inclusion of closed-captioned text on a pre-programmed videotape or broadcast feed. The closed-captioned information contained in the video signal is recognized separately from the single frame content by specially designed chips which convert the analog information contained on the incoming television/video signal, convert CC data into digital data, and provide the television decoder with information formatted in such as way as to enable the text stream to be independently displayed on the television screen. Line Twenty (20) is customarily allocated to include thirty-five (35) 8-bit characters per frame. The ASCII text stream carried by Line Twenty (20) produces letters on the screen of a conventional television set. The text itself is derived from the spoken content of the audio track, manually entered by a keyboard operator and displayed in closed-captioned form for the benefit of the hearing impaired.

Line Twenty-one (21) is ordinarily unallocated. The X Chip system's proprietary compressed video packet (CVP) data format consists of highly compressed digital data packets which are carried on Line Twenty-one (21) of the video frame broadcast signal. Each packet contains 336,000 bits of compressed information, 90% of which is video data and 9.95% of which is audio data. The signal consists of identifier bits that correspond to the decompression algorithm which is resident in the B Level Task Manager section of the digital signal processing (DSP) chip. Each frame associated with Line Twenty-one (21) data contains thirty-five (35) 8-bit character-equivalents which are compressed at the rate of 1200:1 by a proprietary data compression algorithm, which is programmed into the DSP incorporated into the circuitry of the system 206. The CVP's are embedded on Line Twenty-one (21) of each video frame, at the point of production or broadcast by a proprietary device which operates in conjunction with the non-linear video editing equipment used to produce the programming at its point of origin or broadcast.

Video Single Frames

Programming in the video signal containing CVP's is routed into the X Chip system 206 which accommodates any RF input source which incorporates channel selector circuitry prior to delivery of video frames to the X Chip input circuit. This assumes that the X Chip system 206 will accommodate input signals from any compatible device such as a VCR, DVD player or optical disk reader in the form of a series of single video frames. Each frame of coded video input is divided into frame-specific components of video and audio data which is encoded in the industry standard format. Each frame consists of a video component, an audio component, a closed-captioned ASCII text stream component on Line Twenty (20) and a CVP component onLine Twenty-one (21). The device works with equal facility in NTSC, PAL, SECCAM, HDTV and other video formats.

X Chip Input Circuit

Each frame of video programming routed into the X Chip input circuit 208 is segregated into its constituent components by microcontroller chip sets that have been designed to recognize and process each frame component separately. The X Chip system 206 includes four function-specific microcontroller chipsets. Each of these IC's divides, recognizes and segregates a specific portion of the incoming video signal into a separate information processing channels. Each data channel originating in each microcontroller chip is then connected directly to the appropriate data processing input connections embedded in the selected digital signal processing chipset. The X Chip system 206 converts the analog waveform into recognizable digital data. These chipsets consist of a video microcontroller 210, an audio microcontroller 212, a closed-captioned microcontroller 214 and a CVP microcontroller 216. The microcontrollers each have an input connected to the video signal input line 200 and are responsive to portions of the video program signal.

Digital Signal Processor

The X Chip device 206 incorporates a proprietary digital signal processor (DSP) 218 into its circuitry which is comprised of three integrated circuits married into a single IC component. In the X Chip, each level (A, B and C) of data processing capability is partitioned to accommodate the specific unique data processing requirements associated with each of the four segregated video frame signals.

Level A, the Multi-Task Manager, operates as a multi-tasking process controller acting as the traffic controller and allocating DSP clock cycles to perform each of the resident functions programmed or embedded into the DSP circuits and memory modules. Its functions are segregated into four distinct operations, each of which is associated with the processing of data from each component of the dissected video frame. Thus, video tasks 220 are performed on the video signal portion received from the video microprocessor 210, audio tasks 222 are performed on the audio signal portion received from the audio microprocessor 212, CC tasks 224 are performed on the closed-captioned signal portion received from the CC microprocessor 214, and CVP tasks 226 are performed on the compressed video packet signal portion received from the CVP microprocessor 216.

Level B, the Data Processing functions, operates as the data processing center. A separate software proven has been developed to perform the data processing functions required for each of the four segregated components of the incoming video signal. These functions are performed simultaneously according to the design architecture of the DSP which has been selected. Level B is partitioned to accommodate four specific, mutually exclusive and distinct varieties of data processing. Video processing 228 is performed on the results or the video tasks 220, ASR processing 230 is performed on the results of the audio tasks 222, text reader processing 232 is performed oil the results of the CC asks 224, and CVP processing 234 is performed on the results of the CVP tasks 236. The CVP processing includes "Enable PIP" (picture-in-picture), Audio/On/Off, Archive and Timer.

Level C, the Random Access Memory (RAM), consists or dynamic random access memory. The RAM is partitioned and formatted to archive four specific, mutually exclusive and distinct categories of data, one each for each type of processing task. A video lookup table 236 is associated with the video processing 228, an ASR network 238 is associated with the ASR processing 230, a text library 240 is associated with the text reader 232, and a CVP RAM storage 242 is associated with the CVP processing 234.

Radio Frequency Modulator

Once the data processing functions conducted by the DSP 218 have been completed, the four modified components dissected from the original video frame components are recombined into a single modified video frame and re-routed to a RF Modulator 244. The RF modulator 244 is the component incorporated in the X Chip system 206 circuitry that converts the digital data processed in the DSP 218 back into an analog form. The RF modulator 244 converts the digital data output from the DSP 218 into an integrated analog waveform, which is the modified video frame and which is recognizable by the decoder circuit of a standard target device, such as a television, video monitor or HDTV for processing and display. As shown in FIG. 3, a standard television decoder 246 receives the incoming video signal from the X Chip RF, modulator device 244 in analog form. The original pre-programmed signal is passed on to the television as modified to scramble individual video frames 248, to mute individual words or word combinations 250, to delete text from the closed-captioned strip 252 and to augment, by including picture-in-picture information from the CVP files 254. The television circuitry then "reads" the incoming signal as if it were the original signal and processes it for display.

Video Processing

At the point of production or broadcast, the video signal is processed by a proprietary integrated device which embeds a combination of data bytes onto the analog waveform, which identify the frame as (1) unobjectionable, (2) containing scenes which depict frontal nudity, (3) containing scenes which graphically depict sexual acts, (4) containing scenes which depict extreme violence, (5) containing scenes which depict drug use, and (6) any other category specified. The video content of the video frame is dissected from the raw signal and extracted for processing in the video microcontroller chipset 210, where the waveform data carried by the video signal is converted to manageable digital data. The digital data is passed on to the DSP 218 for further processing. The DSP 218 is programmed with a proprietary software routine which recognizes the code which was embedded in the waveform of the original frame at the point of production or broadcast. The encoded data is compared with the comparator lookup table 236 contained in a specially partitioned segment of Level C of the DSP 218. The video lookup table 236 contains five items which correspond to the encode signal embedded in selected frames of the video signal at the point of production or broadcast: (1) frontal nudity, (2) gratuitous sex, (3) extreme violence, (4) drug use and (5) other. When the Level B comparator 228 identifies a category contained in the Level C lookup table 236 that matches the single frame encode, this triggers the "video frame scramble" function of the video microprocessor. If a match is found, the comparator then looks to the program manager to determine if the "video frame scramble" toggle has been activated by the user. If the "video frame scramble" toggle has been activated for the code which has been identified, then the software routine resident in Level B of the DSP performs a video signal modification operation which, when the video portion of the signal is passed on to the television decoder via the RF modulator 244, causes the individual frame of video programming to be displayed on the screen of the target device in a way which is unrecognizable or "scrambled".

Audio Processing

As the NTSC single frame waveform enters the audio microcontroller 212, this chipset dissects the audio portion of the signal from the waveform, extracts it for processing, and converts it to a digital data format for further processing by the DSP 218. The audio tasks are performed by the Level B embedded software module. A proprietary Automatic Speech Recognition (ASR) engine 230 embedded in the audio portion of Level B of the DSP 218 performs the following functions: (1) identifies linguistic phonemes contained in the incoming audio portion of the waveform, (2) extracts the phoneme from the waveform and processes it via a phoneme identifier network, (3) analyzes the glottal stop portion ol the waveform to provide feedback comparator to the extracted phoneme, (4) subjects the phoneme data to a neural network context comparator at the same time as, (5) it subjects the phoneme data to an expert system network whose functions are defined by grammatical protocols, (6) converts the incoming data into an outgoing strewn of linguistically corrected text, (7) compares the text stream as it is developed with the words, word combinations and phrases contained in the Level C text stream library 240, (8) operates a text comparator function and (9) when any portion of text produced by the ASR matches the contents of the lookup table, (10) operationalizcs a software routine which sends a signal to the television decoder which alters the incoming signal in such a way as to mute the word, word combination or phrases which arc contained in the sequence of video frames.

The ASR network 238 consists of a series of integrated networks which simultaneously perform neural network (context), expert system (grammatical) and phoneme recognition functions in the same manner as human brain processes spoken language. The library contained in Level C is segregated into three groups of words and word combinations. Each library section is coded to correspond to a specific level of language screening security, which can be selected or de-selected from time to time by the user. Each subsequent segment contains language that is deemed to be more offensive than the one which precedes it. When the comparator discovers a match between the text stream being generated by the ASR routine and the words contained in the language lookup table, the language screening program then looks to the task manager routine (Level A of the DSP) to determine whether the security level in which the match has been found has been activated by the user. If the language screening function has been enabled by the user, the language screening program embedded in the audio partition of Level B manipulates the audio data so that no sound is heard by the user when the single video frame is passed on to the television decoder via the RF modulator 244.

Closed-Captioned Processing the closed-captioning (CC) microcontroller 214 recognizes the ASCII text stream data contained on Line Twenty (20) of the single frame analog waveform as it is introduced into the input circuit 208. The text stream is passed on to the closed-captioned processing partition 224 resident in the DSP 218. The CC text reader 232 compares the text stream provided on Line Twenty (20) of the incoming video signal with the contents of the same lookup table and word/phrase library on the Line twenty (20) text stream with words, word combinations or phrases contained in the Level C lookup table of the Text Library 240. The DSP 218 engages the comparator program which compares the text stream contained on Line Twenty (20) with the text contained in the language lookup table. When a match is found, the comparator looks to the closed-captioning task manager program 224 to determine whether the language screening function has been enabled by the viewer. If this function has been toggled on, the comparator then engages the signal manipulation routine which deletes the objectionable text from the ASCII text stream and then passes the modified signal component on to the television decoder 246 via the RF modulator 244.

Compressed Video Packet Processing (CVP)

Each frame of video programming introduced into the input circuit 208 contains an area designated as Line Twenty-one (21) by the STU standard. Conventional television programming does not rely on any data contained in this segment of each frame. Each frame contains sufficient bandwidth to accommodate up to thirty-five (35) 8-bit characters of information in ASCII format. When single frames of video programming have been processed by X Out's proprietary data compression algorithm, Line Twenty-one (21) of each franie contains 336K bits of compressed video and audio data in a proprietary format. When the video signal is introduced into the X Chip input circuit 208, the CVP microcontroller chip set 216 detects the presence of a code sequence which identifies Linc Twenty-one (21) as CVP data. The CVP data is passed from the microccontroller 216 to the DSP 218, where the CVP is processed by the resident data processing and decompression software. The CVP data contains, among other things, a sequence of code which tells the CVP processor 226 whether the CVP is to be immediately decompressed, processed through the RF modulator 244 and displayed on the target screen, or whether the CVP is to be archived in a specially partitioned segment of Level C of the DSP RAM 242 for future retrieval and processing. The timer contained in the CVP code sequence 234 enables the CVP processor software routine 226 to (1) store the data, (2) retrieve and process the data one or more times at future, specific dates and times; (3) delete the data after a specific number of processing cycles, and (4) permanently embed the data for continuously cycled processing.

Each CVP packet also contains audio data. The user is provided with an "on/off" switch on a hand held remote control unit 256 (see FIG. 3) which makes it possible for the user to toggle the CVP audio on or off. The RAM partition 242 contained in Level C of the DSP 218 is capable of saving multiple CVP data packets simultaneously for future use and display. When the timer routine recognizes that a CVP archived in Level C RAM 242 is to be enabled, the resident CVP processing routine 226 then decompresses the CVP, looks to the task manager to determine whether the CVP audio has been enabled and then passes the decompressed CVP data on to the RF modulator 244 where it is converted back into an analog form and displayed on the screen of the target device as a "picture-in-picture" image, with or without sound.

Handheld IR Remote Control Functions

The hand held Infra-Red (IR) remote control unit 256 used by the viewer provides the following functions: (1) password controlled access 258 to the security. selection control and the programmable text library; (2) five levels of "video image scramble" security 260; (3) three levels of audio word content muting 262; (4) three levels of (CC) closed-captioned text stream language. deletion 264; (5) CVP "PIP" enable/disable 266; and (6) CVP audio enable/disable 266. A standard ten key alpha-numeric key pad 268 (e.g. cellular telephone design) is provided on the unit 256 to support addition, deletion or editing of text contained in all three levels of the programmable text library.

In summary, the video signal processing system according to the present invention includes an apparatus and a method for manipulating video, audio, closed-captioned and compressed video packet data embedded in video programming signals. A video signal processor is utilized to embed data into a video program signal prior to broadcast or recording, the video program signal containing at least one of video information, audio information, closed-captioned information and video packet data information and the embedded data being embedded in at least one predetermined line of at least one predetermined frame of the video program signal. The X Chip system performs a method for removing a portion of the video program signal comprising the steps of: a) recognizing the components of human speech in a highly accurate digital format; b) discriminating words, phrases, and sound audio signals received by a television receiver; c) dissecting waveform equivalents of speech and strings of text into discrete components; d) matching the discrete components of the received television broadcast signal with the components of previously recognized human speech; e) deleting portions of the received television broadcast signal corresponding to the previously selected and/or recognized human speech and/or text components; and f) permitting the balance of the audio signals received by the television receiver to be broadcast as originally produced and transmitted. The X Chip system performs this method utilizing an input circuit having microcontrollers for recognizing and segregating selected portions of the video program signal, a digital signal processor for modifying the video, audio, closed-captioned and compressed video packets information segregated by the input circuit and an RF modulator for combining the processed portions for display by a display device.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for manipulating information embedded in video program signals comprising:
   an input means having an input for receiving a video program signal, said input means recognizing and segregating a selected portion of the video program signal as a data signal at an output;
   a digital signal processor having an input connected to said input means output for modifying the data signal to exclude objectionable content and generating the modified data signal at an output;
   a radio frequency modulator having an input connected to said digital signal processor output and being responsive to the modified data signal for generating a modified video program signal recognizable by a standard television signal decoder circuit whereby the objectionable content is not available to a viewer upon subsequent display of the modified video program signal; and
   wherein said input means includes a compressed video packet microcontroller for recognizing and segregating a compressed video packet information portion of the video program signal and generating the data signal as a compressed video packet data signal, said digital signal processor processes the compressed video packet data signal and generates the processed compressed video packet data signal, and said radio frequency modulator generates the modified video program signal with a picture-in-picture image.

2. The apparatus according to claim 1 wherein said input means includes microcontroller means for recognizing and segregating at least one of video, audio and closed-captioned information embedded in the video program signal.

3. The apparatus according to claim 2 wherein said microcontroller means includes a video microcontroller for recognizing and segregating a video information portion of the video program signal and generating the data signal as a video data signal, said digital signal processor modifies the video data signal to exclude objectionable content and generates the modified video data signal, and said radio frequency modulator generates the modified video program signal with objectionable video frames scrambled.

4. The apparatus according to claim 2 wherein said microcontroller means includes an audio microcontroller for recognizing and segregating an audio information portion of the video program signal and generating the data signal as an audio data signal, said digital signal processor modifies the audio data signal to exclude objectionable content and generates the modified audio data signal, and said radio frequency modulator generates the modified video program signal with objectionable words muted.

5. The apparatus according to claim 2 wherein said microcontroller means includes a closed-captioned microcontroller for recognizing and segregating a closed-captioned information portion of the video program signal and generating the data signal as a closed-captioned data signal, said digital signal processor modifies the closed-captioned data signal to exclude objectionable content and generates the modified closed-captioned data signal, and said radio frequency modulator generates the modified video program signal with objectionable closed-captioned text deleted.

6. The apparatus according to claim 1 wherein said digital signal processor includes a memory for storing the compressed video packet information portion of the video program signal for processing at a later time.

7. The apparatus according to claim 1 including a remote control for generating control signals upon actuation by a viewer and wherein said digital signal processor is responsive to the control signals to select a security level from at least two security levels of at least one of video security, audio security and closed-captioned security.

8. The apparatus according to claim 1 wherein said radio frequency modulator generates the picture-in-picture image in a form capable of being displayed as a full screen image by a standard television.

9. A method for modifying a selected portion of a video program signal comprising the steps of:
   a. recognizing and segregating a selected portion of a video program signal as a data signal;
   b. recognizing components of the data signal as being objectionable to a viewer;

c. modifying the data signal to exclude objectionable content; and d. generating the modified data signal as a modified video program signal recognizable by a standard television signal decoder circuit whereby the objectionable content is not available to a viewer upon subsequent display of the modified video program signal wherein said step a. is performed on a compressed video packet information portion of the video program signal said steps b. and c. are performed by processing the closed-captioned information and said step d. is performed by generating the modified video program signal with a picture-in-picture image.

10. The method according to claim 9 wherein said step a. is performed on a video information portion of the video program signal, said steps b. and c. are performed by modifying the video information to exclude objectionable content and said step d. is performed by generating the modified video program signal with objectionable video frames scrambled.

11. The method according to claim 9 wherein said step a. is performed on an audio information portion of the video program signal, said steps b. and c. are performed by modifying the audio information to exclude objectionable content and said step d. is performed by generating the modified video program signal with objectionable words muted.

12. The method according to claim 9 wherein said step a. is performed on a closed-captioned information portion of the video program signal, said steps b. and c. are performed by modifying the closed-captioned information to exclude objectionable content and said step d. is performed by generating the modified video program signal with objectionable closed-captioned text deleted.

13. The method according to claim 9 wherein said digital signal processor includes a memory for storing the compressed video packet information portion of the video program signal and said steps b., c. and d. are performed at a later time.

14. The method according to claim 9 wherein said step a. is performed on a video information portion of the video program signal, said steps b. and c. are performed by modifying the video information to exclude objectionable content and said step d. is performed by generating the modified video program signal with objectionable video frames deleted.

15. The method according to claim 9 wherein said step d. is performed by generating the picture-in-picture image in a form capable of being displayed as a full screen image by a standard television.

* * * * *